United States Patent
Kelley et al.

(10) Patent No.: US 6,214,487 B1
(45) Date of Patent: Apr. 10, 2001

(54) INTEGRAL SENSORS FOR MONITORING A FUEL CELL MEMBRANE AND METHODS OF MONITORING

(75) Inventors: Ronald J. Kelley, Coral Springs; Robert J. Mulligan, Lauderhill; Steven D. Pratt; Sivakumar Muthuswamy, both of Plantation; Bobby Dean Landreth, Fort Lauderdale; Robert W. Pennisi, Boca Raton, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/241,190

(22) Filed: Feb. 1, 1999

(51) Int. Cl.[7] ........................................ H01M 8/04
(52) U.S. Cl. ........................................ 429/23
(58) Field of Search ........................ 429/12, 13, 18, 429/22–25, 27, 40–42, 61–62, 90–93, 101

(56) References Cited

U.S. PATENT DOCUMENTS

| | | |
|---|---|---|
| 5,302,471 | * 4/1994 | Ito et al. . |
| 5,504,433 | 4/1996 | Kunz ........................... 324/693 |
| 5,763,113 | 6/1998 | Meltser et al. ................ 429/13 |
| 5,853,910 | * 12/1998 | Tomioka et al. . |
| 5,925,476 | * 7/1999 | Kawatsu . |
| 6,004,696 | * 12/1999 | Barnett et al. . |
| 6,077,621 | * 6/2000 | Allen et al. . |

* cited by examiner

Primary Examiner—Carol Chaney
Assistant Examiner—Susy Tsang
(74) Attorney, Agent, or Firm—Dale W. Dorinski (57) ABSTRACT

A membrane electrode assembly consists of a polymer electrolyte membrane (100) with an electrode on each side. The polymer electrolyte membrane has an integral sensor (115) disposed on the surface. The sensor monitors the physical, thermal, chemical or electrical state of the membrane electrode assembly. Information obtained from the sensor is used to identify a defective membrane electrode assembly, and the operation of the fuel cell is altered based on the identified defective membrane electrode assembly.

25 Claims, 7 Drawing Sheets

INTEGRAL SENSORS FOR MONITORING A FUEL CELL MEMBRANE AND METHODS OF MONITORING

TECHNICAL FIELD

This invention relates in general to fuel cells, and more particularly to fuel cells having a measuring means integral to the solid electrolyte.

BACKGROUND

In fuel cells, electrical energy is produced by reacting a fuel with an oxidant in the presence of a catalyst. A typical fuel cell consists of a fuel electrode (anode) and an oxidant electrode (cathode), separated by an ion-conducting electrolyte. The electrodes are connected to a load (such as an electronic circuit) by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. At the anode, incoming hydrogen gas ionizes to produce hydrogen ions and electrons. Since the electrolyte is not an electronic conductor, the electrons flow away from the anode via the external circuit. At the cathode, oxygen gas reacts with the hydrogen ions migrating through the electrolyte and the incoming electrons from the external circuit to produce water as a byproduct, which is then typically extracted as a vapor. One well-known type of fuel cell includes a "membrane-electrode-assembly" (MEA) which is typically a thin, proton-transmissive, solid polymer membrane electrolyte having an anode on one of its faces and a cathode on the opposite face. The MEA is sandwiched between a pair of electrically conductive elements which serve as current collectors for the anode and cathode, and contain appropriate channels and/or openings therein for distributing the fuel cell's gaseous reactants over the surfaces of the respective anode and cathode catalysts. One such MEA and fuel cell is described in U.S. Pat. No. 5,272,017. In practice, a number of these unit fuel cells are normally stacked or 'ganged' together to form a fuel cell stack or assembly. The individual cells are electrically connected in series by abutting the anode current collector of one cell with the cathode current collector of its nearest neighbor in the stack. Degradation or failure of only a single one of the unit cells in the stack lowers the overall performance of the fuel cell assembly, and may completely disable it. Fuel cells fail for a number of reasons including carbon monoxide poisoning of the catalyst, flooding of the cells with water, and leakage of gaseous hydrogen around or through the proton exchange membrane. Transport of gaseous hydrogen to the cathode side of the membrane can result in non-useful hydrogen consumption, loss of cell/stack efficiencies and a drop in cell voltage. Carbon monoxide poisoning and/or water flooding result in a drop in the unit cell and/or stack voltage. When any of these situations are indicated, corrective action is warranted to prevent irreversible cell/stack degradation. If one of the membranes in the stack degrades or malfunctions, the entire stack must be removed and disassembled in order to repair the cell. In the case of stack designs where welding and/or adhesive are used for assembly, the entire stack may need to be discarded. In addition, the inner cells of the stack do not operate at the same efficiency as the outer cells of the stack due to differences in temperature and humidity between the outside and inside layers.

It would be highly desirable if there were a way to monitor the performance of the individual cells during operation of the fuel cell assembly and then to adjust the operation of the fuel cell stack to either optimize it in response to various environmental conditions or to compensate for a degraded unit cell. Some in the prior art have attempted to solve this problem by electrically interrupting the cell from operation for a few milliseconds and measuring current and voltage of the cell at some fixed point. This method has the disadvantage of requiring a complicated switching scheme. The cell has to be switched to a test load, measured, then switched back. In addition, the information is limited to a single point or at most, a few points on the current-voltage (IV) curve, which tells little about the condition of the actual cell.

DETAILED DESCRIPTION OF THE PREFERRED EMBODIMENT

The deficiencies of the prior art have led us to conclude that it would be advantageous to monitor the condition of the individual fuel cells during operation of the fuel cell stack to identify poorly performing cells. This information could then be used to shut down the cell or adjust the input of fuel and oxidant to the cell to recondition the membrane or re-distribute the fuel to achieve its most efficient use and achieve optimal performance of the fuel cell system. A sensor placed on or near individual MEA cells of a fuel cell stack that detects a change in factors including (but not limited to), dielectric constant, resistance, electrical impedance, or capacitance can be used to infer the temperature, moisture content, flow rate, etc. of that individual cell. A feedback loop can be set up using this data to regulate parameters to the cell (such as fuel or oxidant flow rate) or the entire system (electrical load balancing) to achieve optimal performance. The present invention contemplates method and apparatus for monitoring the performance of the individual fuel cells in a fuel cell stack, and, optionally, automatically triggering corrective measures (e.g., alert the operator, initiate preventative or corrective action) when the performance degrades to an unacceptable level. More specifically, the present invention contemplates measuring the physical, thermal, electrical or chemical state of an MEA in each of the individual fuel cells via a sensor integrally disposed on the MEA; determining whether any of the individual fuel cells are unacceptable by comparing the measured state to a predetermined standard; and altering the operation of the fuel cell stack when the measured state indicates that one or more of the individual fuel cells are unacceptable. Each of the MEAs in the individual fuel cells has an integral sensor on the solid polymer electrolyte to monitor the physical, thermal, chemical or electrical state of the MEA.

The stack typically is made up of a plurality of individual fuel cells. Each individual cell comprises (1) a proton exchange membrane having an anode and a cathode affixed to opposing first and second surfaces of the membrane, (2) a first flow channel adjacent the anode for passing fuel (typically hydrogen) into contact with the anode, and (3) a second flow channel adjacent the cathode for flowing an oxygen-bearing gas (preferably air) into contact with the cathode. Sensors on each of the MEAs monitor the cell voltage as well as individual cell voltages. A number of measurements, calculations, and comparisons to predetermined reference values are made to determine the condition of the stack, and, based thereon, corrective measures are taken such as alerting the stack's operator of impending or prospective undesirable condition(s), and/or automatically initiating preventative actions to mitigate such condition(s). Materials can be deposited directly onto the solid electrolyte to form a sensor that is an integral part of the MEA. For example, conductive material can be deposited to form capacitors or thermocouples, resistive material can be deposited to form resistors for temperature sensors, and piezoelectric materials can be deposited to make acoustical sensors. Other materials and sensors include but are not limited to; shape memory alloys, magnetoresistive, magnetoconstrictive, magnetic, and ferroelectric.

Our invention is not limited to any particular geometry. In fact, it can be used on individual cells in a stack or on tubular cells as long as the cells can be individually controlled. One way to perform the sensing operation is to measure the complex dielectric constant of the fuel cell membrane. Using the detected response the cell performance is optimized (controlling temperature, humidification, oxidant flow, oxidant pressure, fuel flow, fuel pressure, fuel stoichiometry, electrical load). Using complex dielectric measurement offers a number of advantages:

1. Performance can be measured and optimized while the cell is in operation without any complicated high power switching.

2. The optimization can respond to both fast and slow changes in the cell performance.

3. The optimization routine can determine the degree of humidification of the cathode and anode side of the MEA allowing for better control of humidification, longer membrane life, and better fuel cell performance.

4. The results of the complex dielectric test will indicate whether performance can be optimized or whether there is a material failure.

5. A failing cell can be identified by the system and replaced.

Figure 1:
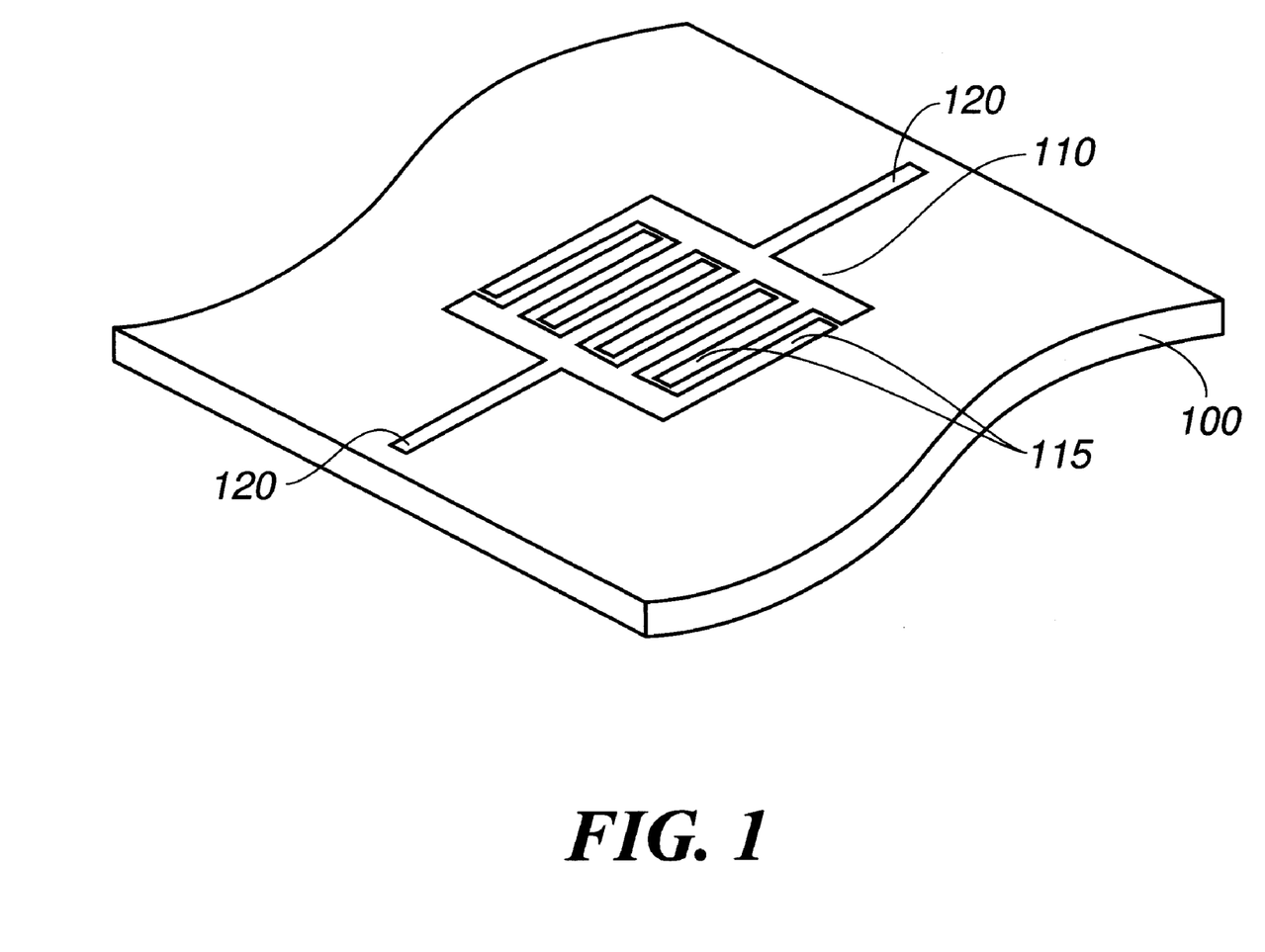
FIG. 1 is an isometric view of a solid state electrolyte with an integral sensor in accordance with the invention.

Referring now to FIG. 1, an MEA 100 has an interdigital capacitor 110 placed in intimate contact with the membrane. This can be accomplished in a number of ways, such as screen printing, thin film deposition, electroless plating, and more. The most expeditious method of achieving this is to form the capacitor using the same process employed to create the electrode material. For example, if the electrode of the MEA is screen printed then the interdigital capacitor 110 should also be screen printed, thus reducing manufacturing steps. For example, conductive ink can be deposited onto the membrane substrate of a polymer electrolyte membrane (PEM). It may be patterned as a circuit with interdigitated traces 115 or as a solid shape. The deposition can be on one or both sides of the substrate, depending on the application. For example, the AC impedance through the thickness of the MEA could be measured if two solid patterns were deposited on either side of the membrane forming the parallel plates of a capacitive device to which an AC signal could be applied. When patterning the sensor, it should be electrically isolated from the electrode, and an easy method of achieving this is to create a blank border around the sensor. Although not specifically shown in FIG. 1, one skilled in the art will realize that the remainder of the surface of the MEA 100 typically contains an electrode. On opening in the electrode should be created so that the sensor can be intimately and directly attached, bonded or deposited to the MEA in that opening. A blank area that exposes portions of the polymer membrane surrounds the sensor and the associated interconnects to electrically isolate it from the electrode. The sensor portion can be positioned near the edge of the PEM or a circuit runner 120 can be patterned to extend to the edge of the substrate so that an electrical connection can be made (similar to a edge card connector or compressive elastomeric connectors). One alternative configuration is to use a plate-like sensor on each side of the MEA so the electrically characteristics of the membrane are measured in bulk. A small "keep out" region is patterned around both so the sensors to electrically isolate them from the electrode. This allows the rest of the surface to be used as the active area of the MEA. In addition, a plurality of sensors can be distributed on the surface so that different parts of the membrane can be monitored. The capacitor structure should consume no more than a minor fraction of the available surface area. Although an interdigitated capacitor is depicted in FIG. 1, other arrangements of capacitors can also be realized, and are to be considered to fall within the metes and bounds of our claimed invention.

Figure 2:
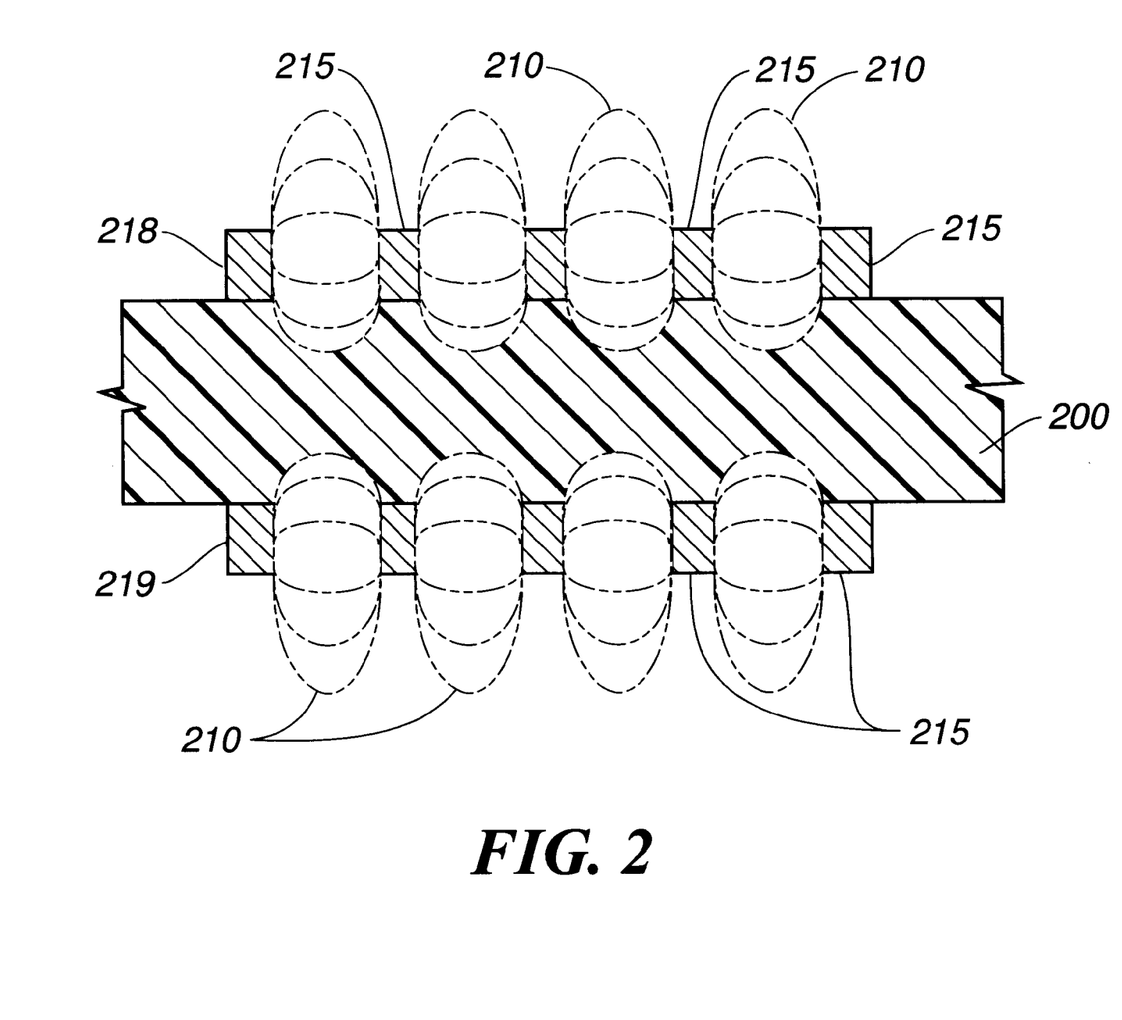
FIG. 2 is a cross-sectional view of the sensor of FIG. 1 through section 2—2, depicting the field lines of the capacitor.

The interdigitated fingers of the capacitor provides a geometry that is very sensitive to the dielectric constant at the surface of the material. As can be seen in the cross-sectional representation in FIG. 2, the electric field lines 210 are predominantly between the fingers 215 of the capacitor. The field 210 drops off in the bulk of the material. The top interdigital capacitor 218 primarily measures the dielectric constant on the top (anode side) of the membrane 200, while the bottom capacitor 219 measures the dielectric constant on the cathode side. This is very important because the degree of humidification of the membrane in operation is not the same on both sides. In general the anode side tends to dry out first which reduces ionic conductivity. At the same time, the cathode tends to become over hydrated, reducing its porosity and inhibiting oxidant flow to the cathode. In operation a cell can become overly hydrated on the cathode, and under hydrated on the anode side. By placing an interdigital capacitor on both sides of the membrane the anode and cathode membrane interfaces can be monitored independently.

Figure 3:
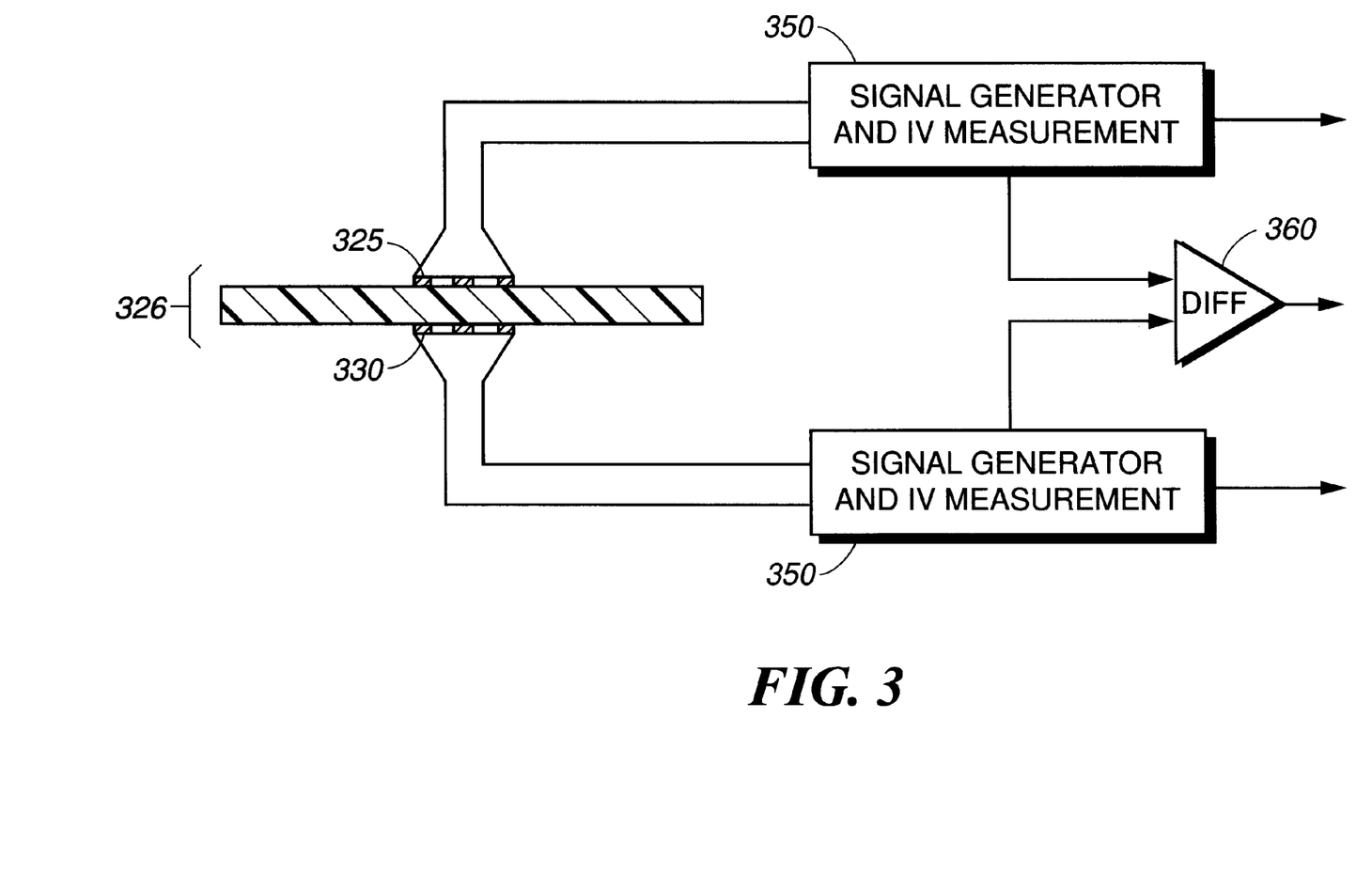
FIG. 3 is a schematic flowchart depicting the measurement of complex dielectric constant using interdigital capacitors.

Referring now to FIG. 3, the complex dielectric constant of an MEA can be determined using a signal generator in conjunction with the capacitor. Signal generators 350 produce an alternating current (AC) voltage which is applied to the plates 325,330 of the capacitor 326. Note that the drawing depicts the plates 325,330 as fingers of an interdigitated capacitor. The current and voltage across the capacitor are measured (along with the relative phase), and the IV measurement unit in the signal generator 350 calculates the dielectric constant ($e_r$) and the loss tangent (tan d), by comparing the voltage and current measurements to stored values. In addition, they can be compared in a differential comparator 360 to obtain a signal that is proportional to the difference of the measured values. From the loss tangent, the degree of hydration of the MEA can be determined. (The more water in the membrane, the greater the loss tangent.) The differential signal is proportional to the degree of difference in hydration between the cathode and anode. The value of the dielectric constant at different frequencies can be used to determine the condition of the membrane and the amount of hydration. This is because the dielectric response is a function of frequency. Different dielectric mechanisms occur at different time scales. For example, ionic conductivity has a slower response than the dipole response. The signal from the ion transport can be modeled with longer R-C time constants than the dipole response of the water. This means that the hydration of the membrane can be determined. In a similar way the faster chemical reactions at the anode can be separated from the slower oxidation reactions at the cathode. Thus the condition of the electrodes can now be determined.

Figure 4:
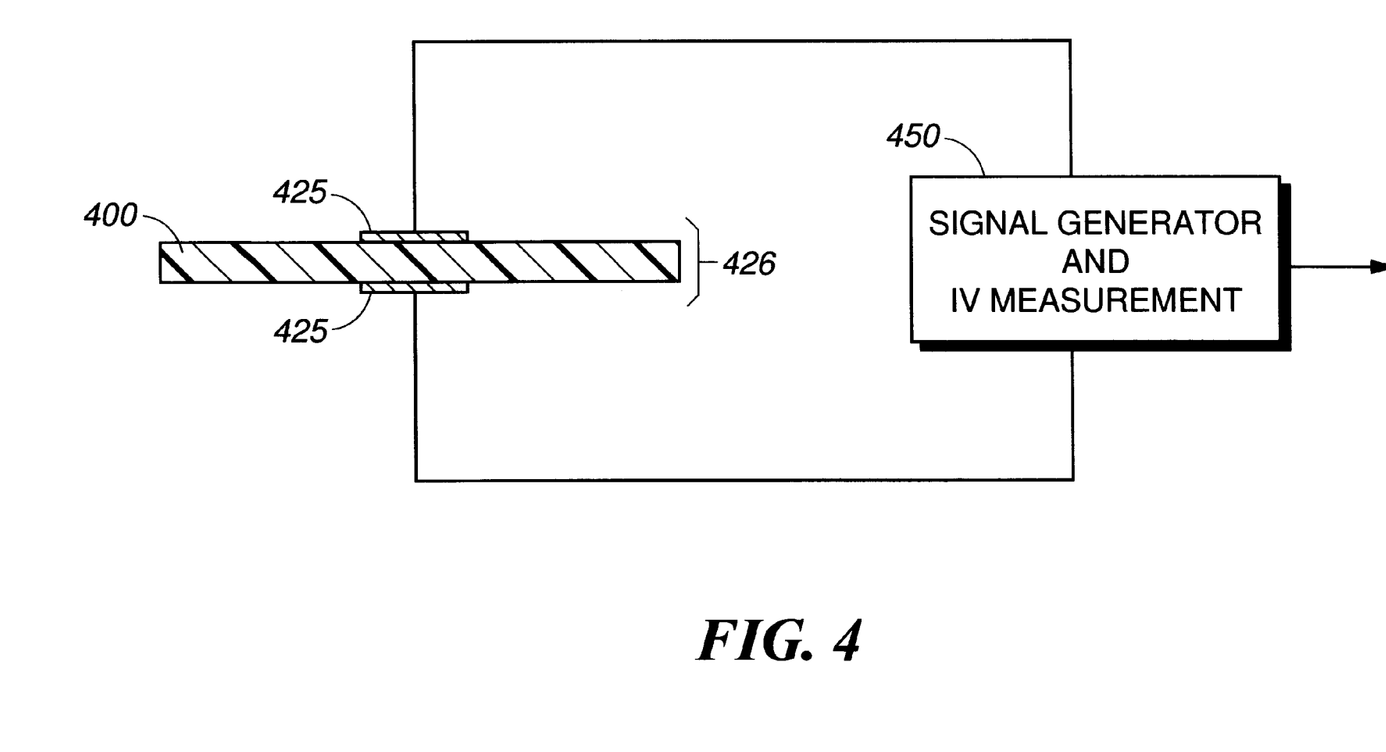
FIG. 4 is a schematic flowchart depicting the measurement of complex dielectric constant using the parallel plate method.

In addition to the measuring the dielectric constant at the surface of the membrane, the 'bulk' dielectric constant can be measured. FIG. 4 shows such an arrangement. The membrane 400 is sandwiched between the two plates 425 of a parallel plate capacitor 426. A signal generator 450 applies an AC signal to the plates 425 and the current and voltage are measured (along with the phase of the two signals). The loss tangent and dielectric constant of the bulk material are determined from the current, voltage, and relative phase angle. In this instance, the AC signal is applied across the membrane, rather than at the surface. The bulk loss tangent and dielectric constant provides the same information as in the case outlined above, except that it indicates an average condition of the bulk material.

Figure 5:
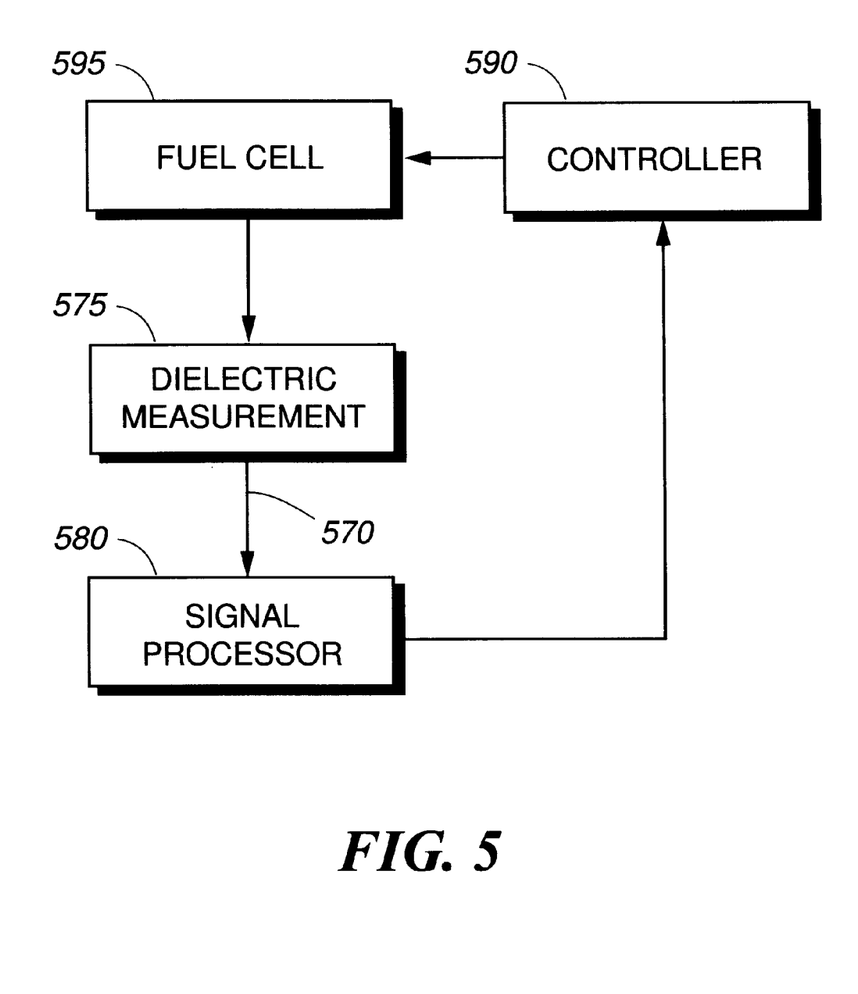
FIG. 5 is a high level control diagram for the methods shown in FIGS. 3 and 4.

FIG. 5 is a high level control diagram of the optimization routine. The signal 570 (loss tangent and dielectric constant) from the dielectric measurement 575 is sent to the signal processor 580. The signal processor 580 compares the response to a look-up table or a model to determine that cell performance based on the concepts outlined in the above paragraphs. The signal processor 580 then sends appropriate commands to the controller 590 to alter the operational parameters or the fuel cell 595. For example, if, when the signal processor compared the complex response of the system to the model, it found that the dipole response had decreased at the anode, it would mean that the membrane is becoming dehydrated at the anode. The temperature of the cell indicated that it is within the desired range and the cathode dielectric response indicated that the cathode is properly hydrated. The controller would then seek to humidify the fuel going to the anode. Other conditions are handled in a similar fashion.

Figure 6:
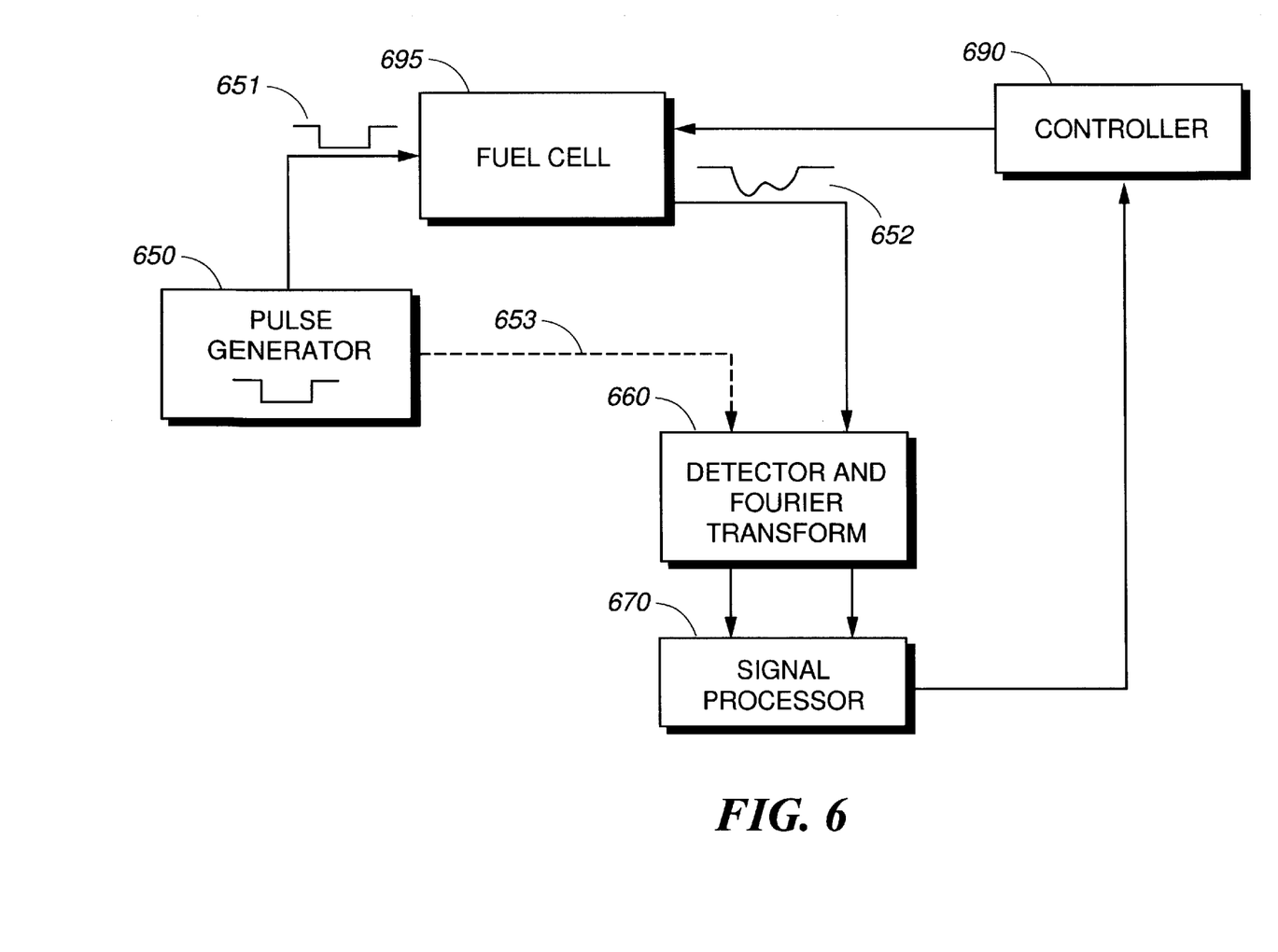
FIG. 6 is a block diagram of a fuel cell optimization method utilizing the measured transient response of a fuel cell in accordance with the invention.

An additional method of optimizing fuel cell performance via an integral sensor is based on the transient response of the cell to an applied pulse or square wave. Referring to FIG. 6, a pulse generator 650 applies a square wave pulse or wave train 651 to one of the electrodes of the fuel cell 695 and the output pulse 652 is received by the detector 660. The output wave form is a complex signal whose Fourier components represent the response of the system. This wave form is Fourier transformed and compared to the Fourier components of the reference signal 653. The complex response can be compared to a serial and parallel RC network model of the cell. This analysis is identical to that of a transient analysis performed in digital signal analysis. This type of analysis is well known in the art;, and will not be further elaborated upon here. Since the electrode/ionomer interface provides a characteristic response that differs from the ionic transport across the membrane, the ion transport can be modeled as a series resistance while the interface can be modeled as a parallel RC combination in series with the membrane. The signal from the ion transport can be modeled with longer RC time constants than the dipolar response of the water, insuring that the hydration of the membrane can be determined from the model. In a similar way the faster chemical reactions at the anode can be separated from the slower oxidation reactions at the cathode. Thus, the condition of the electrodes can be determined.

The signal from the detector 660 goes to a signal processor 670, where it is compared to a look-up table or a model to measure cell performance. The signal processor 670 then sends commands to an intelligent controller 690 to alter the operational parameters of the system. For example, the signal processor compares the complex response of the system to the model and might find that dipolar response has decreased. This would mean that the membrane is becoming dehydrated. It also measures the temperature of the cell and finds that it is within the desired range. A signal is then sent to the controller, which will reduce the air flow to the cathode so that hydration will increase. If reducing the airflow would reduce the output power of the fuel cell too much, the controller would humidify the air before it enters the cell. Other conditions are handled in a similar fashion.

The transient response technique offers a number of advantages, in addition to those already enumerated for the other techniques:

1. The test can determine the condition of the material in addition to cell electrical performance.

2. The results of the transient response test will indicate which of the many input parameters are best varied to optimize performance.

3. The test can determine what the failure mode of the material so that the root cause can be determined. For example catalyst failure vs. ionomer failure can be identified.

Figure 7:
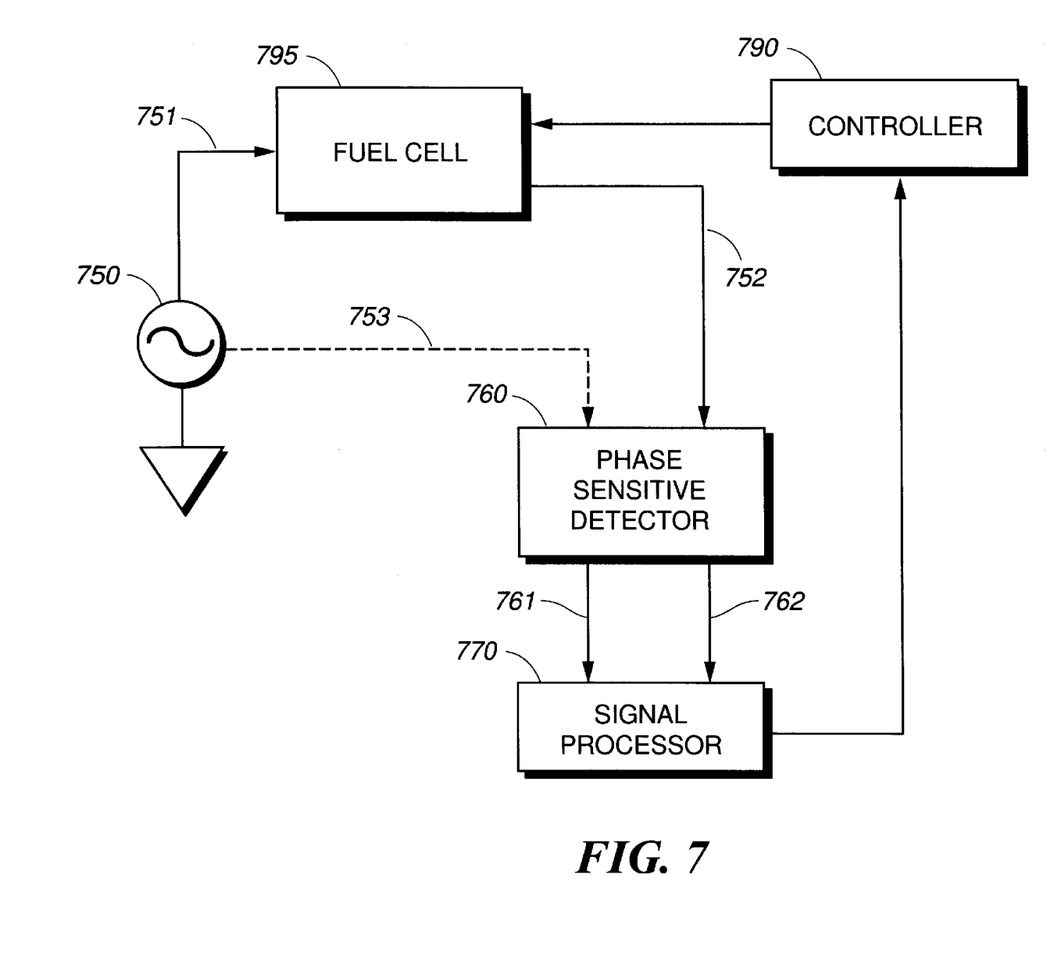
FIG. 7 is a block diagram of a fuel cell optimization method utilizing AC impedance and phase detection in accordance with the invention.

Referring now to FIG. 7 another method for optimizing fuel cell performance, based on the AC response of the cell to an applied AC signal, is shown. An AC signal 751 is applied to one of the electrodes of the fuel cell 795 by an AC source 750, and the response 752 is detected by a phase sensitive detector 760 on the other electrode. As noted supra, the detectors or sensors are integrally disposed on the solid electrolyte membrane. The phase sensitive detector 760 compares the response signal 752 to a reference signal 753. Two signals 761, 762 are output, one in-phase and one out-of-phase with the input signal 751. These signals represent the complex response of the cell. The complex response can be compared to a serial and parallel RC network model of the cell in much the same fashion as the transient detector analysis previously described. The signals from the phase detector 760 go to a signal processor 770, which sends commands to an intelligent controller 790.

Having now described the sensors and their operation, the method of operating a fuel cell using the sensors will be elucidated. The physical, thermal, chemical or electrical state of the membrane electrode assembly is monitored using an appropriate sensor and method. If the conditions in the fuel cell are such that an abnormal signal is detected by a controller, the controller will then identify the defective membrane electrode assembly based on the monitored signal. The controller contains the necessary instructions for: operation of the sensors, acquiring the sensor signals, monitoring the fuel cell, data manipulation, and communication algorithms. The sensors communicates with the controller though the means of any appropriate communication protocol, many of which are known in the art. A specific program for carrying out the functions of the controller may be accomplished by standard skill in the art using conventional information processing languages. The electronic controller takes the form of a conventional general purpose digital computer based controller programmed to control the operating parameters of the fuel cell stack system to the power demands placed on the system, and to diagnose the condition of the stack. A number of preferred controllers are manufactured by Motorola Inc., and are well known to those skilled in the art.

The controller then alters the operation of the fuel cell, either in response to an identified defective membrane, or in order to optimize the operation of the fuel cell assembly. For example, individual unit cells in the fuel cell assembly may not be defective, but might simply be operating suboptimally, due, for example, to localized flooding or dehydration. In this instance, those unit cells can be electrically switched in or out of service by the controller, and when they return to optimum condition at a later time, they can be switched back in again. Optionally, the controller can also initiate corrective measures to alter the flow of fuel or oxidant to the identified membrane assembly, or it can reduce the electrical output of the fuel cell assembly. Such measures may include triggering visual or audible alerts to the stack operator to take appropriate action, or automatically initiating preventative measures in a closed loop feedback sequence.

According to a preferred embodiment of the invention, certain telltales, or advance indicators of the stack's prospective condition are also provided by the sensors, which can automatically trigger appropriate actions to mitigate such conditions in ample time to correct the matter, before they become serious. Some examples of these conditions are carbon monoxide poisoning, dehydration of the polymer electrolyte membrane, hydrogen leakage, low fuel, and perforations in the membrane.

In summary, integrating sensors on MEA membranes reduces complexity and part count. Incorporation of the sensor into the device it is measuring achieves reduced electrical loses and accurate measurements due to proximity. Using the conductive electrode material as both the sensor and active area of the membrane can further simplify manufacturing. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A membrane electrode assembly having an integral sensor, comprising:
    a polymer electrolyte membrane having two major surfaces and an electrode on each of the two major surfaces; and
    a sensor for monitoring one or more parameters of the membrane electrode assembly, said parameters selected from the group consisting of temperature, hydration, ionic conductivity, AC impedance, resistivity, capacitance, dielectric constant, complex dielectric constant, bulk dielectric constant, and response of the membrane electrode assembly, wherein the sensor is on one of the two major surfaces, and wherein the sensor is an integral part of the membrane electrode assembly.

2. The membrane electrode assembly as described in claim 1, wherein the sensor comprises the same material as the electrode.

3. The membrane electrode assembly as described in claim 1, wherein the sensor is a resistive element, a capacitive element or a piezoelectric element.

4. The membrane electrode assembly as described in claim 1, wherein a plurality of sensors are on the polymer electrolyte membrane.

5. The membrane electrode assembly as described in claim 1, further comprising an electrical connection, a first portion attached to the sensor and a second portion extending to a perimeter of the membrane electrode assembly.

6. The membrane electrode assembly as described in claim 1, wherein the sensor is on both sides of the polymer electrolyte membrane.

7. The membrane electrode assembly as described in claim 1, wherein the sensor monitors the state of the membrane electrode assembly by measuring the impedance of the membrane electrode assembly.

8. The membrane electrode assembly as described in claim 1, wherein the sensor is electrically isolated from the electrode.

9. A method of operating a fuel cell assembly having membrane electrode assemblies with sensors, comprising the steps of;
    monitoring one or more parameters of the membrane electrode assemblies via one or more sensors that are integrally on each of the membrane electrode assemblies, said parameters selected from the group consisting of temperature, hydration, ionic conductivity, AC impedance, resistivity, capacitance, dielectric constant, complex dielectric constant, bulk dielectric constant, and response; and
    optimizing the operation of the fuel cell assembly in response to the monitored parameters.

10. The method as described in claim 9, wherein the steps of monitoring and optimizing are repeated to provide closed-loop feedback.

11. A membrane electrode assembly having an integral sensor, comprising a polymer electrolyte membrane having an electrode and a sensor on one major surface of the polymer electrolyte membrane to monitor one or more parameters of the membrane electrode assembly, said parameters selected from the group consisting of temperature, hydration, ionic conductivity, AC impedance, resistivity, capacitance, dielectric constant, complex dielectric constant, bulk dielectric constant, and response of the membrane electrode assembly.

12. The membrane electrode assembly as described in claim 11, wherein the sensor is a resistive element or a capacitive element.

13. A method of operating a fuel cell assembly having membrane electrode assemblies with sensors, each membrane electrode assembly comprising a polymer electrolyte membrane, the method comprising the steps of:
    monitoring one or more parameters of one or more of the membrane electrode assemblies via one or more sensors integrally on the polymer electrolyte membranes in the membrane electrode assemblies, said parameters selected from the group consisting of temperature, hydration, ionic conductivity, AC impedance, resistivity, capacitance, dielectric constant, complex dielectric constant, bulk dielectric constant, and response of one or more of the membrane electrode assemblies;

identifying a membrane electrode assembly that is operating sub-optimally by using the monitored parameters; and altering the operation of the fuel cell assembly based on the identified sub-optimal membrane electrode assembly.

14. The method as described in claim 13, wherein the step of monitoring comprises measuring the AC impedance of the membrane electrode assembly.

15. The method as described in claim 13, wherein the step of monitoring comprises pulsing the membrane electrode assembly with an AC signal and measuring the response of the membrane electrode assembly.

16. The method as described in claim 13, wherein the steps of monitoring, identifying and altering are performed while the fuel cell assembly is operating.

17. The method as described in claim 13, wherein the step of monitoring comprises measuring the complex dielectric constant of the membrane electrode assembly.

18. The method as described in claim 17, wherein the degree of hydration of the membrane electrode assembly is calculated using the measured value of the complex dielectric constant.

19. The method as described in claim 13, wherein the step of altering comprises adjusting the input of fuel or oxidant to the fuel cell assembly.

20. The method as described in claim 13, wherein the step of altering comprises reducing the fuel or oxidant to the identified membrane electrode assembly.

21. The method as described in claim 13, wherein the step of altering comprises reducing the electrical output of the fuel cell assembly.

22. The method as described in claim 13, wherein the steps of monitoring, identifying and altering are repeated to form a closed-loop feedback.

23. The method as described in claim 13, wherein the steps of monitoring, identifying and altering are per formed by a microcontroller.

24. A method of operating a fuel cell assembly having membrane electrode assemblies with sensors, comprising the steps of;

measuring the AC impedance of the membrane electrode assemblies via one or more sensors integrally on each of the membrane electrode assemblies;

identifying a membrane electrode assembly that is operating sub-optimally by using the measured AC impedance; and altering the operation of the fuel cell assembly based on the identified sub-optimal membrane electrode assembly.

25. A method for monitoring the individual fuel cells in a fuel cell stack and altering the stack's operation in response to said monitoring, comprising the steps of:

a. measuring one or more parameters of a membrane electrode assembly in each of said individual fuel cells via a sensor integrally on said membrane electrode assembly, said parameters selected from the group consisting of temperature, hydration, ionic conductivity, AC impedance, resistivity, capacitance, dielectric constant, complex dielectric constant, bulk dielectric constant, and response;

b. comparing the measured parameters to predetermined standards; and c. altering the operation of the fuel cell stack when the comparison performed in step (b) indicates that the measured parameters do not meet the predetermined standards.

* * * * *